(12) United States Patent
Lingelbach et al.

(10) Patent No.: US 11,459,185 B1
(45) Date of Patent: Oct. 4, 2022

(54) PNEUMATIC TRANSPORT SYSTEM INCLUDING PHARMACEUTICAL TRANSPORT CLEANER HAVING A ROTATABLE BAND AND RELATED METHODS

(71) Applicant: Inmar Rx Solutions, Inc., Ft. Worth, TX (US)

(72) Inventors: Matthew Lingelbach, Clemmons, NC (US); Melissa Bube, High Point, NC (US); Vlad A. Catlan, Winston-Salem, NC (US); Marko Milojevic, Jamestown, NC (US); Jared O. Santibanez, Forney, TX (US)

(73) Assignee: INMAR RX SOLUTIONS, INC., Ft. Worth, TX (US)

( * ) Notice: Subject to any disclaimer, the term of this patent is extended or adjusted under 35 U.S.C. 154(b) by 0 days.

(21) Appl. No.: 17/313,411

(22) Filed: May 6, 2021

(51) Int. Cl.
  *B65G 45/24* (2006.01)
  *B65G 45/18* (2006.01)
  *B65G 51/06* (2006.01)

(52) U.S. Cl.
  CPC ............. *B65G 45/18* (2013.01); *B65G 51/06* (2013.01)

(58) Field of Classification Search
  CPC ........ B65G 45/16; B65G 45/18; B65G 45/22; B65G 45/24; B65G 51/04; B65G 51/06; B65G 2201/0276; B65G 2201/0291; B08B 9/04; B08B 9/053; B08B 9/0553; B08B 9/0557; B08B 9/057; B08B 1/002

USPC ........ 406/184, 190, 197; 198/495, 496, 617; 15/104.12, 104.62, 104.66, 104.09, 15/104.13, 104.2, 104.19
  See application file for complete search history.

(56) References Cited

U.S. PATENT DOCUMENTS

| | | | | |
|---|---|---|---|---|
| 3,673,629 A | * | 7/1972 | Casey | B08B 9/0553 15/104.061 |
| 3,725,968 A | * | 4/1973 | Knapp | B29C 44/1266 15/104.061 |
| 4,027,349 A | * | 6/1977 | Clavin | B08B 9/049 15/104.12 |
| 4,333,773 A | * | 6/1982 | Fjallstrom | C23G 3/04 134/22.12 |
| 4,422,210 A | * | 12/1983 | Bergsand | B08B 9/027 134/168 C |
| 4,473,921 A | * | 10/1984 | Weber | B08B 9/035 15/104.09 |
| 4,635,663 A | * | 1/1987 | Rollins | B08B 9/032 134/166 C |
| 4,856,941 A | * | 8/1989 | Morimoto | B65G 53/525 406/85 |
| 4,859,276 A | * | 8/1989 | John, Jr. | G21C 3/06 216/90 |
| 4,863,555 A | * | 9/1989 | John, Jr. | C23F 1/08 216/91 |

(Continued)

*Primary Examiner* — Joseph A Dillon, Jr.
(74) *Attorney, Agent, or Firm* — Allen, Dyer, Doppelt + Gilchrist, P.A.

(57) ABSTRACT

A pharmaceutical transport system may include a pneumatic tube network and a pharmaceutical transport cleaner. The pharmaceutical transport cleaner may include a cylindrical body, and a rotatable cleaning band extending around the cylindrical body to contact and clean adjacent portions of the pneumatic tube network as the cylindrical body moves through the pneumatic tube network.

46 Claims, 5 Drawing Sheets

(56) References Cited

U.S. PATENT DOCUMENTS

| | | | | |
|---|---|---|---|---|
| 4,907,314 | A * | 3/1990 | Kershaw | B08B 9/0557 15/104.061 |
| 5,056,962 | A * | 10/1991 | Morimoto | B65G 51/04 406/49 |
| 5,157,982 | A * | 10/1992 | Akesaka | F16L 55/26 74/89.37 |
| 5,560,394 | A * | 10/1996 | Jorgensen | B08B 9/021 138/89 |
| 6,190,090 | B1 * | 2/2001 | Campbell | B08B 9/0551 15/104.061 |
| 6,241,424 | B1 * | 6/2001 | Bath | F16L 1/26 15/104.061 |
| 6,263,535 | B1 * | 7/2001 | Wang | B08B 9/0436 15/104.066 |
| 6,460,617 | B1 * | 10/2002 | Allen | E21B 33/1204 15/104.2 |
| 6,477,442 | B1 * | 11/2002 | Valerino, Sr. | B65G 51/34 414/730 |
| 6,527,869 | B1 * | 3/2003 | Bourg | B08B 9/0551 134/1 |
| 8,281,444 | B2 * | 10/2012 | Rosen | B08B 9/035 15/104.061 |
| 8,388,760 | B2 * | 3/2013 | Aniban, Jr. | E03F 9/00 134/22.11 |
| 9,433,980 | B1 | 9/2016 | Dahl | |
| 9,739,411 | B1 * | 8/2017 | Azimi | B65G 51/04 |
| 10,867,457 | B1 * | 12/2020 | McCracken, Jr. | H04L 63/102 |
| 2003/0056309 | A1 * | 3/2003 | Savard | B08B 9/0551 15/104.061 |
| 2005/0115588 | A1 * | 6/2005 | Farris | B08B 9/0557 134/22.11 |
| 2005/0200037 | A1 * | 9/2005 | Sanders | F16L 55/38 264/36.17 |
| 2006/0150858 | A1 * | 7/2006 | Appleton | F16L 55/38 104/138.1 |
| 2009/0307857 | A1 * | 12/2009 | Hestenes | F16L 55/38 15/104.061 |
| 2012/0042903 | A1 * | 2/2012 | Mousa | B08B 9/0557 134/8 |
| 2012/0192897 | A1 * | 8/2012 | Urakami | F16L 55/1283 134/8 |
| 2012/0291215 | A1 | 11/2012 | Garner et al. | |
| 2013/0279993 | A1 * | 10/2013 | Castro | B65G 51/26 406/154 |
| 2015/0101734 | A1 | 4/2015 | Wirth et al. | |
| 2015/0217323 | A1 * | 8/2015 | Broze | F16L 55/26 427/239 |
| 2017/0313524 | A1 * | 11/2017 | Thorn | F16L 55/46 |
| 2018/0141091 | A1 * | 5/2018 | Sharma | F16L 55/38 |
| 2018/0207693 | A1 * | 7/2018 | Long | B08B 9/0551 |
| 2018/0328146 | A1 * | 11/2018 | Kartha | E21B 37/00 |
| 2019/0224726 | A1 * | 7/2019 | McGahee | A46B 3/20 |
| 2020/0398297 | A1 * | 12/2020 | Bilz | B65G 53/30 |

* cited by examiner

PNEUMATIC TRANSPORT SYSTEM INCLUDING PHARMACEUTICAL TRANSPORT CLEANER HAVING A ROTATABLE BAND AND RELATED METHODS

TECHNICAL FIELD

The present invention relates to the field of pneumatic transport systems, and, more particularly, to containers for pneumatic transport systems and related methods.

BACKGROUND

A pneumatic transport system is a system that propels containers, typically cylindrical in shape, through networks of tubes by compressed air or by partial vacuum. Solid objects may be placed in a container and transported relatively easily through a pneumatic transport system.

One implementation for a pneumatic transport system may be in health care. For example, a hospital may have a pneumatic transport system to distribute pharmaceuticals. In some instances, for example, where controlled pharmaceuticals are distributed, the system may include one or more security features to restrict access to the controlled pharmaceuticals. For example, a lock may be used to restrict access to within the container.

It may be desirable to clean a pneumatic transport system. For example, where the pneumatic transport system transports pharmaceuticals or other biomedical materials, it may be desirable to clean the pneumatic transport system if contents of the container being transported leak from the container.

U.S. Pat. No. 9,433,980 to Dahl discloses a method of cleaning drive-through banking cylinders. Dahl discloses a pig may include bristles arranged on the exterior thereof, and the bristles may be soaked in disinfectant and/or cleaning solution. Transmitting the pig through the pneumatic tube would cause the bristles and disinfectant and/or cleaning solution to contact the inner wall of the pneumatic tube, thereby cleaning, disinfecting, or sanitizing the pneumatic tube.

SUMMARY

A pharmaceutical transport system may include a pneumatic tube network and a pharmaceutical transport cleaner. The pharmaceutical transport cleaner may include a cylindrical body, and a rotatable cleaning band extending around the cylindrical body to contact and clean adjacent portions of the pneumatic tube network as the cylindrical body moves through the pneumatic tube network.

The rotatable cleaning band may include a plurality of bristles, for example. The pharmaceutical transport cleaner may include a plurality of fins within the cylindrical body and coupled to the rotatable cleaning band.

The pharmaceutical transport cleaner may include at least one seal extending around the cylindrical body to define a seal between the pharmaceutical transport cleaner and adjacent portions of the pneumatic tube network. The pharmaceutical transport system may also include a cleaning fluid reservoir carried within the cylindrical body, and the cylindrical body may have a cleaning fluid opening therein in fluid communication with the cleaning fluid reservoir, for example.

The pharmaceutical transport cleaner may include a mechanical bearing carried between the rotatable cleaning band and adjacent portions of the cylindrical body. The cylindrical body may have at least one air inlet opening and at least one air exhaust opening therein on opposing ends thereof, for example.

The pharmaceutical transport cleaner may include a pair of frusto-conical ends caps coupled to opposing ends of the cylindrical body. The frusto-conical ends caps may have at least one air inlet opening and wherein another of the frusto-conical end caps has at least one air exhaust opening therein, for example.

A method aspect is directed to a method of cleaning a pharmaceutical transport system that includes a pneumatic tube network. The method may include moving a pharmaceutical transport cleaner through the pneumatic tube network. The pharmaceutical transport cleaner may include a cylindrical body, and a rotatable cleaning band extending around the cylindrical body to contact and clean adjacent portions of the pneumatic tube network as the cylindrical body moves through the pneumatic tube network.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
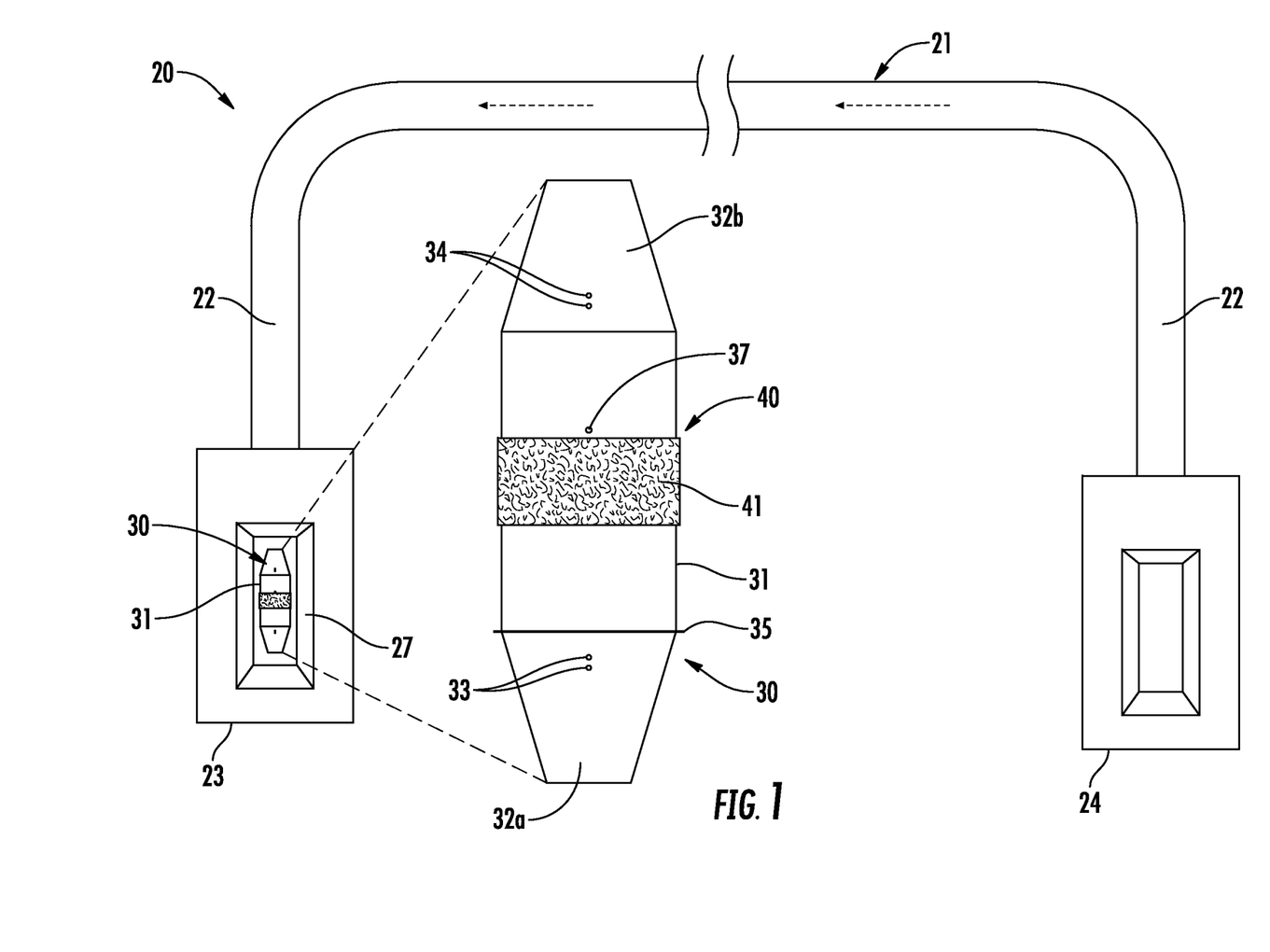
FIG. 1 is a schematic diagram of a pharmaceutical transport system according to an embodiment.
Figure 2:
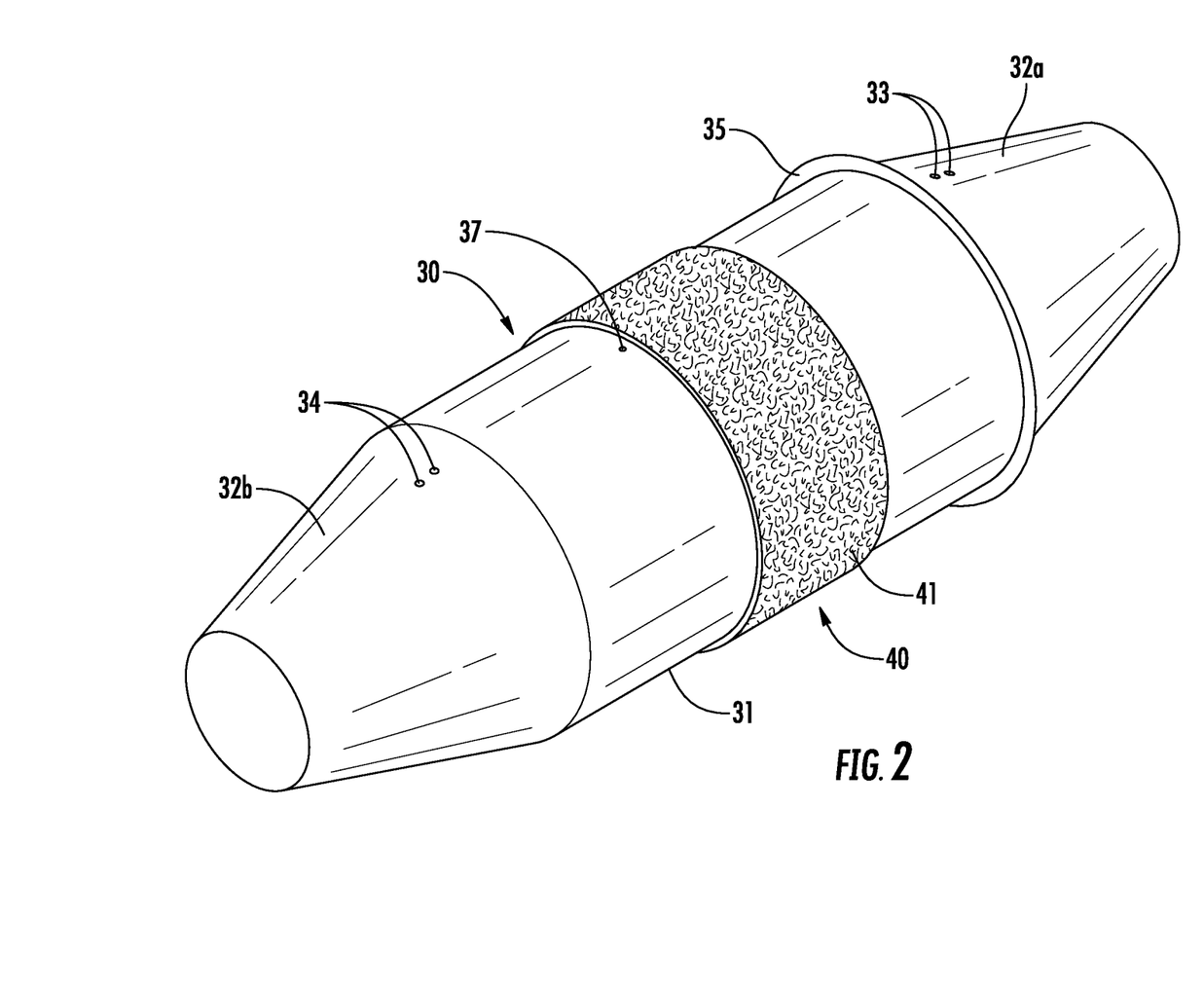
FIG. 2 is a perspective view of the pharmaceutical transport cleaner of FIG. 1.
Figure 3:
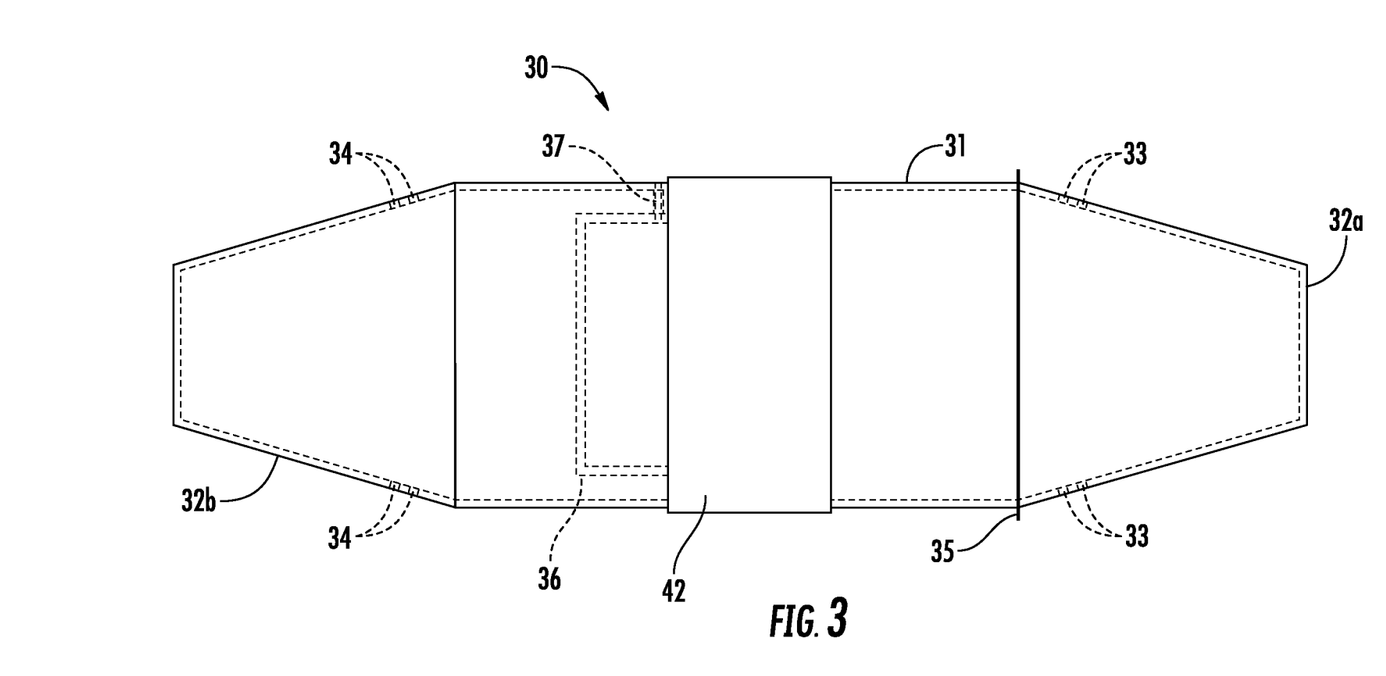
FIG. 3 is a schematic side view of the pharmaceutical transport cleaner of FIG. 1.

Referring initially to FIGS. 1-3, a pharmaceutical transport system 20 includes a pneumatic tube network 21. More particularly, the pneumatic tube network 21 includes at least one tube 22 to permit the transport of pharmaceuticals between endpoints 23, 24 based upon the movement of air, for example, from a blower. The pneumatic tube network 21 may extend throughout a facility, for example, a hospital, to permit transport of the pharmaceuticals throughout the hospital, for example, from a pharmacy to another part of the hospital. Pharmaceuticals may include, for example, medications, medical supplies, biomedical fluids or devices, biological samples, etc. Of course, pharmaceuticals may include other and/or additional items used, for example, in a medical or hospital setting.

A typical pharmaceutical transport system 20, for example, includes a pharmaceutical transport container that is movable within the pneumatic tube network 21. For example, the pharmaceuticals are typically transported through the pneumatic tube network 21 within the pharmaceutical transport container. A pharmaceutical transport container may, for example, have a tubular shape, and have open and closed positions for receiving at least one pharmaceutical therein.

As pharmaceuticals are transported within the pneumatic tube network 21, pharmaceuticals may leak from the transport container system within the pneumatic tube network. Thus, it may be desirable to, from time-to-time or as needed, clean the pneumatic tube network 21, for example, so contaminants are not spread or transported within the pneumatic tube network.

Accordingly, to clean the pneumatic tube network 21, the pharmaceutical transport system 20 includes a pharmaceutical transport cleaner 30. The pharmaceutical transport cleaner 30 includes a cylindrical body 31 and a pair of frusto-conical end caps 32a, 32b coupled to opposing ends of the cylindrical body.

A pair of air inlet or intake openings 33 are in one of the frusto-conical ends caps 32a, for example, a back or rear end cap. The air inlet openings 33 are aligned along a longitudinal axis of the cylindrical body 31 and the pair of frusto-conical end caps 32a, 32b. In some embodiments, the air inlet openings 33 may not be aligned, and there may be any number of any inlet openings, for example, one.

A pair of air exhaust openings 34 are in another of the frusto-conical ends caps 32b, for example, a front end cap. The air exhaust openings 34 are aligned along a longitudinal axis of the cylindrical body 31 and the pair of frusto-conical end caps 32a, 32b with the air inlet openings 33. In some embodiments, the air exhaust openings 34 may not be aligned with each other or the air inlet openings 33, and there may be any number of any air exhaust openings, for example, one.

Figure 4:
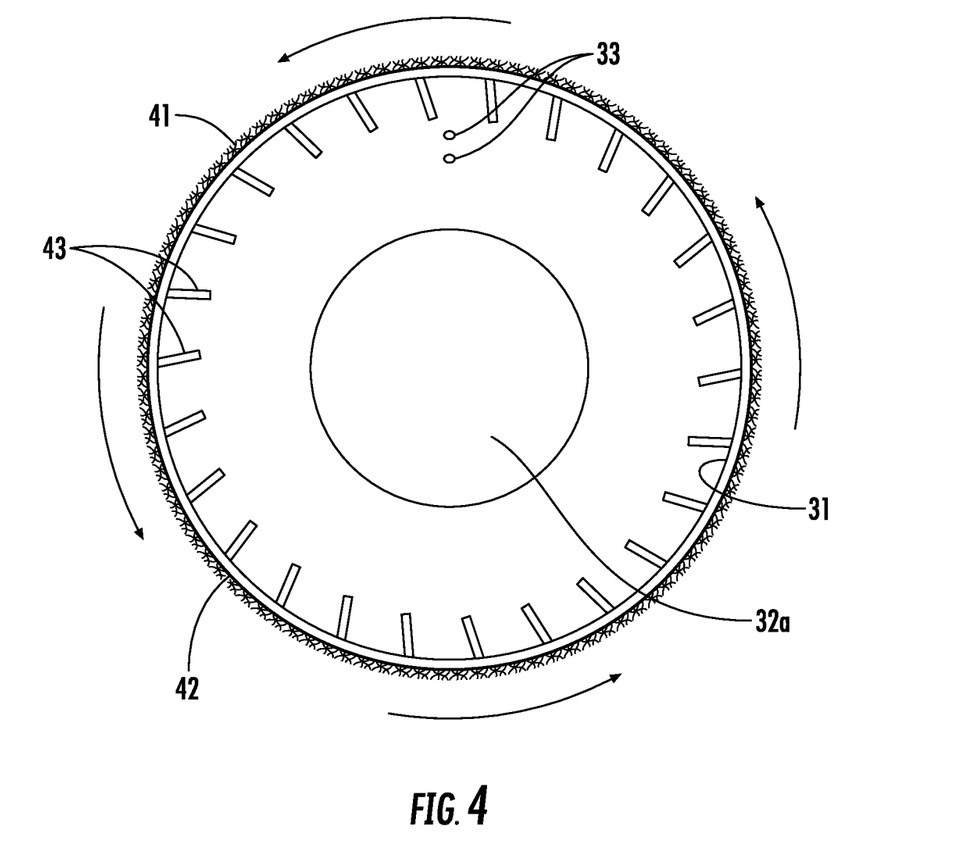
FIG. 4 is a schematic cross-sectional view of a portion of the pharmaceutical transport cleaner of FIG. 1.
Figure 5:
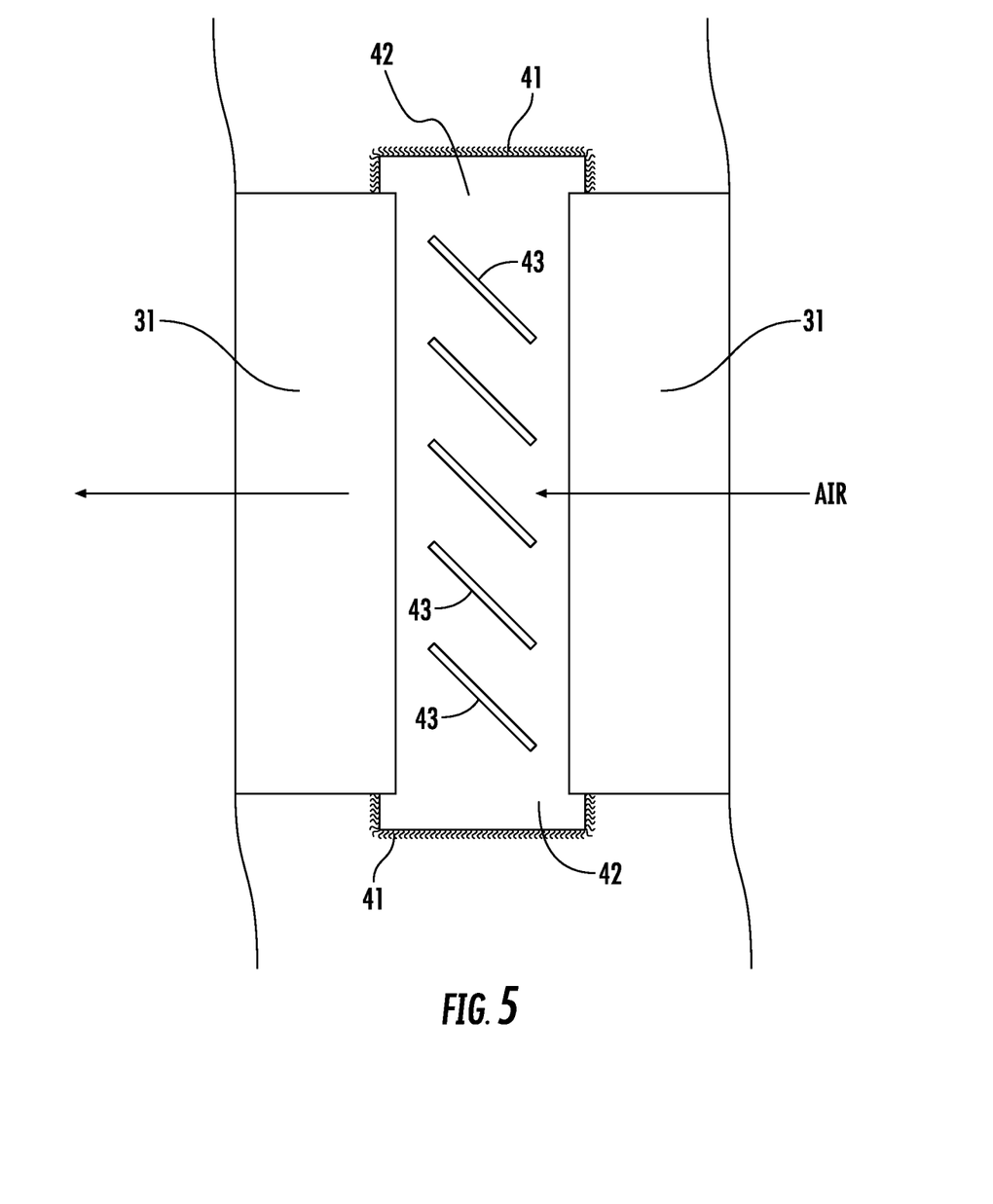
FIG. 5 is a schematic inside view of a portion of the pharmaceutical transport cleaner of FIG. 1.

Referring additionally to FIGS. 4 and 5, a rotatable cleaning band 40 extends around the cylindrical body 31 to contact and clean adjacent portions of the pneumatic tube network 21 as the cylindrical body moves through the pneumatic tube network. The rotatable cleaning band 40 includes bristles 41 defining a brush, for example. A mechanical bearing 42 is carried between the rotatable cleaning band 40 and adjacent portions of the cylindrical body 31. The mechanical bearing 42 permits the rotatable cleaning band 40 to rotate freely about the circumference of the cylindrical body 31.

Fins 43 extend within the cylindrical body and are coupled to the rotatable cleaning band 40. More particularly, the fins 43 may be coupled to the inner circumference of the rotatable cleaning band 40 and extend inwardly within the cylindrical body 31. Thus, the cylindrical body may be slotted or segmented to permit the fins 43 to extend therein. The fins 43 may be angled such that the passage of air thereover causes the rotatable cleaning band 40 to rotate about the cylindrical body 31.

The pharmaceutical transport cleaner 30 also illustratively includes a seal 35 extending around the cylindrical body 31 to define a seal between the pharmaceutical transport cleaner and adjacent portions of the pneumatic tube network 21. The seal 35 may be in the form of an o-ring adjacent the rear of the pharmaceutical transport cleaner 30, and more particularly, adjacent an interface between the cylindrical body 31 and the rear frusto-conical end cap 32a. The seal 35 advantageously acts as a barrier to air passing around the pharmaceutical transport cleaner 30 while being operated or moved in the pneumatic tube network 21. Thus, the seal 35 directs the moving air within the pneumatic tube network 21 through the air inlet and air exhaust openings 33, 34.

A cleaning fluid reservoir 36 is carried within the cylindrical body 31. The cleaning fluid reservoir 36 may include a cleaning fluid, such as, for example, bleach or disinfectant. The cylindrical body 31 illustratively has a cleaning fluid opening 37 therein in fluid communication with the cleaning fluid reservoir 36. The cleaning fluid opening 37 is adjacent the rotatable cleaning band 40 so that as the pharmaceutical transport cleaner 30 is passed through the pneumatic tube network 21, cleaning fluid is extracted via the cleaning fluid opening and directed by the moving air into the bristles 41 of the rotatable cleaning band 40.

During operation, the air from the pneumatic tube network 21 passes through the air intakes and air exhaust openings 33, 34 within the cylindrical body 31 as the pharmaceutical transport cleaner 30 advances along a path of travel. The movement of the pharmaceutical transport cleaner 30 along the path of travel creates an airflow that pulls the cleaning fluid from the cleaning fluid reservoir 36 via the cleaning fluid opening 37 and directs the cleaning fluid into the rotatable cleaning band 40. The same movement of air or airflow that passes through the cylindrical body 31 causes the fins to move, and thus, the rotatable cleaning band 40 to rotate about the cylindrical body. The rotation of the rotatable cleaning band 40 provides a scrubbing effect with the cleaning fluid to adjacent portions of the pneumatic tube network 21. Thus, the pharmaceutical transport cleaner 30 may advantageously clean and/or disinfect inner portions of the pneumatic tube network 21 through which pharmaceutical transport containers operate may be cleaned and/or disinfected, for example, to address spills or contamination.

A method aspect is directed to a method of cleaning a pharmaceutical transport system 20 that includes a pneumatic tube network 21. The method may include moving a pharmaceutical transport cleaner 30 through the pneumatic tube network 21. The pharmaceutical transport cleaner 30 may include a cylindrical body 31, and a rotatable cleaning band 40 extending around the cylindrical body to contact and clean adjacent portions of the pneumatic tube network 21 as the cylindrical body moves through the pneumatic tube network.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A pharmaceutical transport system comprising:
a pneumatic tube network; and
a pharmaceutical transport cleaner comprising
a cylindrical body, and
a rotatable cleaning band having at least one partially arcuate face and rotatable around an outside periphery of the cylindrical body to contact and clean adjacent interior portions of the pneumatic tube network as the cylindrical body moves through the pneumatic tube network.

2. The pharmaceutical transport system of claim 1 wherein said rotatable cleaning band comprises a plurality of bristles.

3. The pharmaceutical transport system of claim 1 wherein said pharmaceutical transport cleaner comprises a plurality of fins within said cylindrical body and coupled to said rotatable cleaning band.

4. The pharmaceutical transport system of claim 1 wherein said pharmaceutical transport cleaner comprises at least one seal extending around the cylindrical body to define a seal between said cylindrical body and adjacent portions of the pneumatic tube network.

5. The pharmaceutical transport system of claim 1 wherein said pharmaceutical transport cleaner comprises a cleaning fluid reservoir carried within said cylindrical body; and wherein said cylindrical body has a cleaning fluid opening therein in fluid communication with said cleaning fluid reservoir.

6. The pharmaceutical transport system of claim 1 wherein said pharmaceutical transport cleaner comprises a mechanical bearing carried between said rotatable cleaning band and adjacent portions of the cylindrical body.

7. The pharmaceutical transport system of claim 1 wherein said cylindrical body has at least one air inlet opening and at least one air exhaust opening therein on opposing ends thereof.

8. The pharmaceutical transport system of claim 1 wherein said pharmaceutical transport cleaner comprises a pair of frusto-conical end caps coupled to opposing ends of said cylindrical body.

9. The pharmaceutical transport system of claim 8 wherein one of said frusto-conical end caps has at least one air inlet opening and wherein another of said frusto-conical end caps has at least one air exhaust opening therein.

10. A pharmaceutical transport cleaner for a pneumatic tube network, the pharmaceutical transport cleaner comprising:
    a cylindrical body; and
    a rotatable cleaning band having at least one partially arcuate face and rotatable around an outside periphery of the cylindrical body to contact and clean adjacent interior portions of the pneumatic tube network as the cylindrical body moves through the pneumatic tube network.

11. The pharmaceutical transport cleaner of claim 10 wherein said rotatable cleaning band comprises a plurality of bristles.

12. The pharmaceutical transport cleaner of claim 10 comprising a plurality of fins within said cylindrical body and coupled to said rotatable cleaning band.

13. The pharmaceutical transport cleaner of claim 10 comprising at least one seal extending around the cylindrical body to define a seal between said cylindrical body and adjacent portions of the pneumatic tube network.

14. The pharmaceutical transport cleaner of claim 10 comprising a cleaning fluid reservoir carried within said cylindrical body; and wherein said cylindrical body has a cleaning fluid opening therein in fluid communication with said cleaning fluid reservoir.

15. The pharmaceutical transport cleaner of claim 10 comprising a mechanical bearing carried between said rotatable cleaning band and adjacent portions of the cylindrical body.

16. The pharmaceutical transport cleaner of claim 10 wherein said cylindrical body has at least one air inlet opening and at least one air exhaust opening therein on opposing ends thereof.

17. The pharmaceutical transport cleaner of claim 10 comprising a pair of frusto-conical end caps coupled to opposing ends of said cylindrical body.

18. The pharmaceutical transport system of claim 17 wherein one of said frusto-conical end caps has at least one air inlet opening and wherein another of said frusto-conical end caps has at least one air exhaust opening therein.

19. A method of cleaning a pharmaceutical transport system comprising a pneumatic tube network, the method comprising:
    moving a pharmaceutical transport cleaner through the pneumatic tube network, the pharmaceutical transport cleaner comprising a cylindrical body, and a rotatable cleaning band having at least one partially arcuate face and rotatable around an outside periphery of the cylindrical body to contact and clean adjacent interior portions of the pneumatic tube network as the cylindrical body moves through the pneumatic tube network.

20. The method of claim 19 wherein the rotatable cleaning band comprises a plurality of bristles.

21. The method of claim 19 wherein the pharmaceutical transport cleaner comprises a plurality of fins within the cylindrical body and coupled to the rotatable cleaning band causing the rotatable band to rotate as the cylindrical body moves through the pneumatic network.

22. The method of claim 19 comprising injecting cleaning fluid into the pneumatic network from a cleaning fluid reservoir carried within the cylindrical body.

23. A pharmaceutical transport system comprising:
    a pneumatic tube network; and
    a pharmaceutical transport cleaner comprising
        a cylindrical body,
        a rotatable cleaning band extending around the cylindrical body to contact and clean adjacent portions of the pneumatic tube network as the cylindrical body moves through the pneumatic tube network, and
        a plurality of fins within said cylindrical body and coupled to said rotatable cleaning band.

24. The pharmaceutical transport system of claim 23 wherein said rotatable cleaning band comprises a plurality of bristles.

25. The pharmaceutical transport system of claim 23 wherein said pharmaceutical transport cleaner comprises at least one seal extending around the cylindrical body to define a seal between said cylindrical body and adjacent portions of the pneumatic tube network.

26. The pharmaceutical transport system of claim 23 wherein said pharmaceutical transport cleaner comprises a cleaning fluid reservoir carried within said cylindrical body; and wherein said cylindrical body has a cleaning fluid opening therein in fluid communication with said cleaning fluid reservoir.

27. A pharmaceutical transport cleaner for a pneumatic tube network, the pharmaceutical transport cleaner comprising:
    a cylindrical body;
    a rotatable cleaning band extending around the cylindrical body to contact and clean adjacent portions of the pneumatic tube network as the cylindrical body moves through the pneumatic tube network; and
    a plurality of fins within said cylindrical body and coupled to said rotatable cleaning band.

28. The pharmaceutical transport cleaner of claim 27 wherein said rotatable cleaning band comprises a plurality of bristles.

29. The pharmaceutical transport cleaner of claim 27 comprising a plurality of fins within said cylindrical body and coupled to said rotatable cleaning band.

30. The pharmaceutical transport cleaner of claim 27 comprising at least one seal extending around the cylindrical body to define a seal between said cylindrical body and adjacent portions of the pneumatic tube network.

31. A method of cleaning a pharmaceutical transport system comprising a pneumatic tube network, the method comprising:
moving a pharmaceutical transport cleaner through the pneumatic tube network, the pharmaceutical transport cleaner comprising a cylindrical body, a rotatable cleaning band extending around the cylindrical body to contact and clean adjacent portions of the pneumatic tube network as the cylindrical body moves through the pneumatic tube network, and a plurality of fins within the cylindrical body and coupled to the rotatable cleaning band causing the rotatable band to rotate as the cylindrical body moves through the pneumatic network.

32. The method of claim 31 wherein the rotatable cleaning band comprises a plurality of bristles.

33. The method of claim 31 comprising injecting cleaning fluid into the pneumatic network from a cleaning fluid reservoir carried within the cylindrical body.

34. A pharmaceutical transport system comprising:
a pneumatic tube network; and
a pharmaceutical transport cleaner comprising
a cylindrical body,
a pair of frusto-conical end caps coupled to opposing ends of said cylindrical body, one of said frusto-conical end caps has at least one air inlet opening and wherein another of said frusto-conical end caps has at least one air exhaust opening therein, and
a rotatable cleaning band extending around the cylindrical body to contact and clean adjacent portions of the pneumatic tube network as the cylindrical body moves through the pneumatic tube network.

35. The pharmaceutical transport system of claim 34 wherein said rotatable cleaning band comprises a plurality of bristles.

36. The pharmaceutical transport system of claim 34 wherein said pharmaceutical transport cleaner comprises at least one seal extending around the cylindrical body to define a seal between said cylindrical body and adjacent portions of the pneumatic tube network.

37. The pharmaceutical transport system of claim 34 wherein said pharmaceutical transport cleaner comprises a cleaning fluid reservoir carried within said cylindrical body; and wherein said cylindrical body has a cleaning fluid opening therein in fluid communication with said cleaning fluid reservoir.

38. A pharmaceutical transport cleaner for a pneumatic tube network, the pharmaceutical transport cleaner comprising:
a cylindrical body;
a pair of frusto-conical end caps coupled to opposing ends of said cylindrical body, one of said frusto-conical end caps has at least one air inlet opening and wherein another of said frusto-conical end caps has at least one air exhaust opening therein; and
a rotatable cleaning band extending around the cylindrical body to contact and clean adjacent portions of the pneumatic tube network as the cylindrical body moves through the pneumatic tube network.

39. The pharmaceutical transport cleaner of claim 38 wherein said rotatable cleaning band comprises a plurality of bristles.

40. The pharmaceutical transport cleaner of claim 38 comprising a plurality of fins within said cylindrical body and coupled to said rotatable cleaning band.

41. The pharmaceutical transport cleaner of claim 38 comprising at least one seal extending around the cylindrical body to define a seal between said cylindrical body and adjacent portions of the pneumatic tube network.

42. The pharmaceutical transport cleaner of claim 38 comprising a cleaning fluid reservoir carried within said cylindrical body; and wherein said cylindrical body has a cleaning fluid opening therein in fluid communication with said cleaning fluid reservoir.

43. A method of cleaning a pharmaceutical transport system comprising a pneumatic tube network, the method comprising:
moving a pharmaceutical transport cleaner through the pneumatic tube network, the pharmaceutical transport cleaner comprising a cylindrical body, a pair of frusto-conical end caps coupled to opposing ends of the cylindrical body, one of the frusto-conical end caps has at least one air inlet opening and wherein another of the frusto-conical end caps has at least one air exhaust opening therein, and a rotatable cleaning band extending around the cylindrical body to contact and clean adjacent portions of the pneumatic tube network as the cylindrical body moves through the pneumatic tube network.

44. The method of claim 43 wherein the rotatable cleaning band comprises a plurality of bristles.

45. The method of claim 43 wherein the pharmaceutical transport cleaner comprises a plurality of fins within the cylindrical body and coupled to the rotatable cleaning band causing the rotatable band to rotate as the cylindrical body moves through the pneumatic network.

46. The method of claim 43 comprising injecting cleaning fluid into the pneumatic network from a cleaning fluid reservoir carried within the cylindrical body.

* * * * *